Aug. 1, 1950     F. R. BUCKLEY ET AL     2,516,851
ROPE BRAKE
Filed Oct. 16, 1945
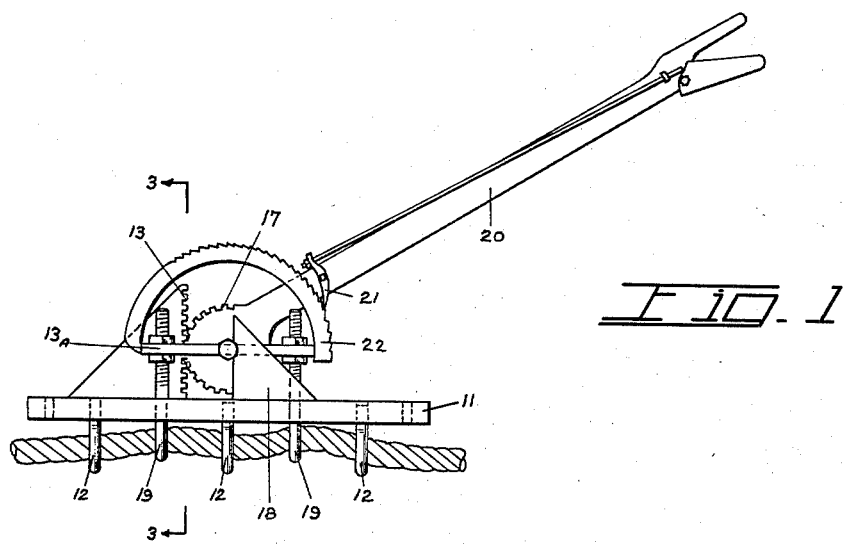
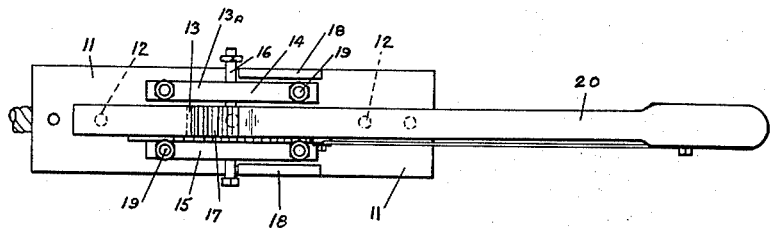
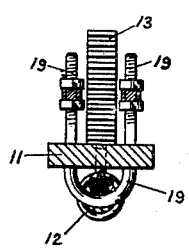
INVENTOR.
FRANK R. BUCKLEY
BY DUDLEY SMYTHE
ATTORNEY.

Patented Aug. 1, 1950

2,516,851

UNITED STATES PATENT OFFICE 2,516,851

ROPE BRAKE

Frank R. Buckley, Nutley, and Dudley Smythe, Lyndhurst, N. J.

Application October 16, 1945, Serial No. 622,669

4 Claims. (Cl. 188—65.1)

(Granted under the act of March 3, 1883, as amended April 30, 1928; 370 O. G. 757)

The present invention relates to a rope brake and has special reference to a manually actuated rope brake that can be adjusted to put sufficient pressure on a rope or line to retard its movement or stop it entirely.

It is often necessary to stop a rope or line having a heavy load on it without slacking the line, as in the use of a rope or line on board a ship to hoist boats or other heavy objects. It is usual to have the line run through blocks with the end secured to a winch for taking up on the line or paying it out.

At present on board ship, when it is desired to brake a line or rope, a rope stop is generally employed between the winch and the blocks. This method is insecure and results in some paying out of the line when the winch is eased off.

With the present brake, the line can be stopped quickly and easily while the full strain is on it without any slipping or paying out when the load is taken off the winch. Thus, an object such as a boat can be hoisted and the line between the blocks and the winch made fast to a cleat or other securing means without any slipping of the line.

An object of the present invention is to provide a rope brake of simple construction that is positive acting and capable of wide usage.

Further objects and advantages of this invention, as well as its construction, arrangement and operation, will be apparent from the following description and claims in connection with the accompanying drawing, in which Fig. 1 is a side elevational view of a rope brake embodying the present invention;

Fig. 2 is a top plan view; and

Fig. 3 is a cross sectional view thereof taken along the line 3—3 of Fig. 1.

Similar numerals refer to similar parts throughout the several views. A rope brake embodying the present invention is provided with a base 11 with eye bolts 12 secured to one side thereof. The shanks of the eye bolts extend preferably into the base 11 with the eye portions of the bolts in substantial alignment and spaced a distance from the base 11. Mounted on the opposite side of the base 11 is a rack 13.

Associated with the base 11 is a carriage 13a, which comprises two side members 14 and 15 with a shaft 16 extending therebetween. A pinion 17 is mounted on the shaft 16 between the two side members 14 and 15 of the carriage. The pinion 17 meshes with the teeth on the rack 13 so that rotation of the pinion causes the carriage 13a to be moved toward and away from the base 11. Side guides 18 mounted on the base 11 serve to guide the shaft 16 and prevent the pinion 17 from moving out of mesh with the rack 13.

Connected to the carriage 13a are U bolts 19. The ends of each of the U bolts 19 are connected to the side members 14 and 15 of the carriage 13a and extend through openings in the base 11 with the loop portions of the U bolts positioned between adjacent eye bolts 12 and in substantial alignment therewith. With this arrangement, the eye bolts 12 and the loop portions of the U bolts 19 form a passageway for a rope or a line. A lever 20 is connected fixedly to the pinion 17 for rotating the latter. Mounted on the lever is a spring-actuated catch or pawl 21 positioned to mesh with the arcuate rack 22 so that after the pinion has been rotated by the handle 20 to move the carriage 13a away from the base 11 the brake can be locked in this position.

To operate the brake, it is first mounted on a support such as a bulkhead, davit or the like, preferably by welding. The side of the base 11 can be welded directly to the support, or brackets can be mounted on the support and the base in turn secured to the brackets. The brake is so positioned that the power end of the rope or line passes through the eye and U bolts with the cleat or other securing member between the brake and the winch or source of power. With this arrangement, the line secured to a power source passes through the brake until such time as it is desired to stop the line, at which time the handle is pulled to rotate the pinion and move the carriage 13a away from the base 11. This movement of the carriage pulls the loop end of the U bolts up toward the base so that the portion of the line between the eye bolts is deflected by the U bolts and the line is held tightly against slipping, the greatest degree of braking being achieved when the line is snubbed against the bottom of base 11.

If it is desired to merely slow up the line passing through the brake, the handle is moved a shorter distance so that the portions of the line between the eye bolts are deflected to a lesser extent. Under these conditions the line is forced against the fixed eye bolts 12 and sufficient friction is exerted to retard the line. Once the brake is set tightly the line can be slacked off from the winch or other source of power and secured to a cleat or other fastening means.

While the present brake has been described hereinabove as having eye bolts and U bolts for the line to pass through, other suitable loop members can be employed so long as one group tends to deflect the line away from the other group.

Various modifications and changes can be made in the subject device without departing from the scope of the invention.

The invention described herein may be manufactured and used by or for the Government of the United States of America for governmental purposes without the payment of any royalties thereon or therefor.

We claim:

1. A rope brake comprising a base having a plurality of rigid loop members mounted on one side thereof in substantial alignment, a carriage movably mounted with respect to said base on a side thereof other than that on which said loop members are mounted, a plurality of loop members mounted on said carriage with at least one of them positioned between adjacent loop members on said base, said groups of loop members providing a passageway for a rope, and means for relatively moving said base and said carriage to cause said loops on said carriage to urge the rope against said rigid loop members and said one side of said base.

2. A rope brake comprising a base having a plurality of rigid loop members fixedly mounted on one side thereof in substantial alignment for fitting about a rope, a carriage movably mounted with respect to said base on the side opposite said loop members, a plurality of rigid loop members attached to said carriage and extending through said base with the loop portions thereof fitting over said rope intermediate the loop members on said base, and means for relatively moving said base and carriage toward and away from each other.

3. A rope brake comprising a base having a plurality of eye bolts fixedly mounted on one side thereof for receiving a rope therethrough, a carriage movably mounted with respect to said base on the side opposite said loop members, a plurality of U bolts passing through said base with their ends connected to said carriage and the loop portions thereof intermediate adjacent eye bolts, a rack on said base extending outwardly adjacent said carriage, a pinion mounted on said carriage and meshing with said rack, and means for rotating said pinion to move said carriage toward and away from said base.

4. A rope brake comprising a base having a plurality of eye bolts mounted fixedly on one side thereof, a carriage mounted movably with respect to said base on the side of said base opposite said loop members, a plurality of U bolts passing through said base with their ends connected to said carriage and selected loop portions thereof intermediate selected eye bolts, a rack on said base extending outwardly adjacent said carriage, a pinion mounted on said carriage and meshing with said rack, means for rotating said pinion to move said carriage relative said base, and means to lock said carriage against movement relative to said base.

FRANK R. BUCKLEY.
DUDLEY SMYTHE.

REFERENCES CITED

The following references are of record in the file of this patent:

UNITED STATES PATENTS

| Number | Name | Date |
|---|---|---|
| 78,794 | Ellis et al. | June 9, 1868 |
| 1,103,056 | Kobert | July 14, 1914 |
| 1,244,136 | Segerdahl et al. | Oct. 23, 1917 |
| 1,578,005 | Krout | Mar. 30, 1926 |

FOREIGN PATENTS

| Number | Country | Date |
|---|---|---|
| 26,601 | Netherlands | Dec. 15, 1932 |
| 268,090 | Great Britain | Mar. 31, 1927 |